United States Patent
Schrötz et al.

(10) Patent No.: US 9,346,911 B2
(45) Date of Patent: May 24, 2016

(54) LIQUID ACCELERATOR COMPOSITION FOR HARDENERS

(71) Applicant: Blue Cube IP LLC, Midland, MI (US)

(72) Inventors: Markus Schrötz, Ochsenhausen (DE); Stefano C. Grassini, Pfaffikon (CH); Marcus Pfarherr, Mittelbiberach (DE); Jeurgen Gaebel, Laupheim (DE)

(73) Assignee: BLUE CUBE IP LLC, Midland, MI (US)

( * ) Notice: Subject to any disclaimer, the term of this patent is extended or adjusted under 35 U.S.C. 154(b) by 66 days.

(21) Appl. No.: 14/356,043

(22) PCT Filed: Nov. 20, 2012

(86) PCT No.: PCT/US2012/065956
§ 371 (c)(1),
(2) Date: May 2, 2014

(87) PCT Pub. No.: WO2013/081895
PCT Pub. Date: Jun. 6, 2013

(65) Prior Publication Data
US 2014/0296381 A1 Oct. 2, 2014

Related U.S. Application Data

(60) Provisional application No. 61/565,712, filed on Dec. 1, 2011.

(51) Int. Cl.
| | | |
|---|---|---|
| C08G 59/42 | (2006.01) | |
| C08G 59/44 | (2006.01) | |
| C08G 59/50 | (2006.01) | |
| C08G 59/68 | (2006.01) | |
| C08G 59/62 | (2006.01) | |
| C08L 63/00 | (2006.01) | |
| C08G 59/18 | (2006.01) | |
| C09D 163/00 | (2006.01) | |

(52) U.S. Cl.
CPC ......... *C08G 59/5026* (2013.01); *C08G 59/184* (2013.01); *C08G 59/4215* (2013.01); *C08G 59/4223* (2013.01); *C08G 59/44* (2013.01); *C08G 59/50* (2013.01); *C08G 59/502* (2013.01); *C08G 59/5006* (2013.01); *C08G 59/5033* (2013.01); *C08G 59/621* (2013.01); *C08G 59/683* (2013.01); *C08G 59/686* (2013.01); *C08L 63/00* (2013.01); *C09D 163/00* (2013.01)

(58) Field of Classification Search
None
See application file for complete search history.

(56) References Cited

U.S. PATENT DOCUMENTS

| | | | | | |
|---|---|---|---|---|---|
| 2,920,040 | A | * | 1/1960 | Jolly | C23F 11/143 206/524.4 |
| 3,218,351 | A | * | 11/1965 | Jolly | C23F 11/143 252/391 |
| 3,397,177 | A | * | 8/1968 | Stolton | C08G 59/4064 502/168 |
| 3,639,828 | A | * | 2/1972 | Salvi | H01H 51/01 324/244 |
| 3,664,858 | A | * | 5/1972 | Huffman | B41M 5/288 428/523 |
| 4,229,563 | A | * | 10/1980 | Foscante | C08G 59/621 528/100 |
| 4,264,758 | A | * | 4/1981 | Waddill | C08G 59/625 528/100 |
| 5,442,035 | A | * | 8/1995 | Corley | C08G 59/687 528/408 |

FOREIGN PATENT DOCUMENTS

EP 2028244 A1 * 2/2009 ........... C08G 59/184

OTHER PUBLICATIONS

HCAPLUS accession No. 1995:246623 for Polish Patent No. 159910 B1, Matynia et al., Jan. 29, 1993, two pages.*
HCAPLUS accession No. 1977:122737 for Czech Patent No. 163890 B1, Stary et al., Nov. 7, 1975, two pages.*

* cited by examiner

*Primary Examiner* — Robert Sellers
(74) *Attorney, Agent, or Firm* — Polsinelli PC

(57) ABSTRACT

A salicylic acid salt-containing liquid composition useful as an accelerator for a hardener includes a reaction product of (a) salicylic acid; and (b) at least one amine compound compatible with said salicylic acid such that the composition is in liquid form, the composition has a concentration of salicylic acid at from about 35 weight percent to about 55 weight percent, and the composition has a viscosity in the range of from about 500 mPas to about 20,000 mPa-s at 25° C.; a curable epoxy resin composition containing the salicylic acid salt-containing liquid composition accelerator; and a cured product made from the curable composition.

14 Claims, No Drawings

LIQUID ACCELERATOR COMPOSITION FOR HARDENERS

FIELD

The present invention is related to a salicylic acid salt-containing liquid accelerator composition useful as an accelerator building block for aminic hardeners and to a curable epoxy resin composition containing such salicylic acid salt-containing liquid accelerator composition.

Salicylic acid is a compound that exists in solid form at room temperature (about 25° C.). Salicylic acid is beneficially used as an accelerator when added as an ingredient in a curable resin composition containing (1) a thermosetting resin; and (2) a hardener (also referred to as curing agent or crosslinking agent), particularly an amine hardener. However, a solid salicylic acid salt is difficult to introduce into a solution of a thermosetting resin and an amine hardener in a sufficient active quantity for the resultant solution to be processable and beneficial without detrimentally affecting the properties of the resultant solution or without creating an insoluble material.

A known hardener composition including a combination of salicylic acid and 2-methylpentanediamine (MPMD) as an amine hardener is disclosed in, for example, U.S. Pat. Nos. 3,026,285; 4,859,788; and 5,017,675. However, such known combination of salicylic acid and 2-methylpentanediamine (MPMD) composition is not produced in the form of a liquid. Therefore, none of the known aminic hardeners, disclosed in the prior art, deliver a salicylic acid material in a liquid form such that the liquid material provides a manageable, a processable and a storage stable building block for curable resin compositions.

Typically, when a hardener formulation contains salicylic acid, the concentration of the salicylic acid is 2-6 parts per weight (ppw). Since salicylic acid is a solid ingredient, salicylic acid makes the process of preparing a hardener formulation containing salicylic acid more complicated than preparing an all liquid ingredients formulation.

The combination of salicylic acid (being in solid form) with an amine is known to be possible for amines only if a solvent, such as benzylalcohol or styrenated phenol, is used in combination with the solid salicylic acid salt and an amine. For example, a typical way to introduce salicylic acid into an aminic hardener formulation is to dissolve the solid salicylic acid in benzyl alcohol and then neutralize the resulting solution with an amine. However, the use of benzyl alcohol as a solvent for salicylic acid before neutralization with an amine may be undesirable because benzyl alcohol is considered to be an undesirable volatile organic compound (VOC) in some formulations. Typical values for the concentration ranges of a curable resin formulation are for example: 5 parts salicylic acid in 35 parts benzyl alcohol and 50 parts amine adducted with 10 parts epoxy resin.

Without a solvent, only three amine compounds: (Jeffamine D-230, Jeffamine D-400, and trimethylpentamethylene diamine), in combination with salicylic acid are known to work adequately without creating an insoluble material. However, the known amine compounds are limited to using a low load level (25 weight percent [wt %] or less) of salicylic acid to prevent forming a viscous insoluble material which would be undesirable in a curable resin composition. It would be desirable to provide an amine compound with a high load (e.g., greater than 25 wt %) of salicylic acid to form an isolated liquid accelerator composition useful in a curable formulation or composition, wherein the liquid accelerator composition has a low viscosity maintaining its processability, manageability and storage stability such that the liquid accelerator composition can be stored for future use.

SUMMARY

The problems of the prior art are addressed by the present invention which is directed to a salicylic acid-containing liquid composition useful as an accelerator building block for aminic hardeners. The salicylic acid-containing liquid composition of the present invention is also referred to herein as an aminic hardener agent, an accelerator building block (or "accelerator"), a reaction precursor, or an accelerator composition reaction product which is in liquid form. The salicylic acid-containing liquid composition is separate and distinct from a thermosetting resin product and an amine hardener product and remains storage stable until further use. The salicylic acid-containing liquid composition is processable in liquid form and is useful as an accelerator additive (in liquid form) in a curable thermosetting resin containing an amine hardener wherein the amine hardener is used for curing the thermosetting resin. In other words, none of the prior art discloses isolating a MPMD/salicylic acid liquid composition, that is, a "methylpentamethylendiammonium disalicylate", and then using the liquid "isolated" MPMD/salicylic acid as an aminic hardener agent for curable resins.

One embodiment of the present invention is directed to a salicylic acid-containing liquid composition useful as an accelerator building block for an amine hardener including the reaction product of (a) salicylic acid; and (b) at least one amine compound compatible with said salicylic acid such that the resultant reaction product composition produced is in liquid form. The liquid composition of the present invention has a concentration of salicylic acid at from about 35 wt % to about 55 wt % in one embodiment; and the liquid composition has a viscosity in the range of from about 500 mPa-s to about 20,000 mPa-s at 25° C. in one embodiment.

Another embodiment of the present invention is directed to a curable epoxy resin composition containing the above accelerator building block, wherein the composition includes (a) at least one epoxy resin, (b) the above accelerator building block; and (c) an amine hardener.

Still another embodiment of the present invention is directed to a cured product made from the above curable epoxy resin composition.

Yet other embodiments of the present invention are directed to processes for making the above accelerator building block, the above epoxy resin curable composition, and the above cured product.

Surprisingly, it has been found that very high loads of salicylic acid such as for example greater than about 25 wt % of salicylic acid in one embodiment and from about 35 wt % and up to about 45 wt % of salicylic acid in another embodiment can be used in combination with an amine compound such as MPMD yielding a material with a low viscosity (e.g., less than about 20000 mPa-s at 30° C.-50° C.) providing a material that is processable and manageable for use in curable compositions such as epoxy resins. No other amine suitable for curing epoxy resins is known that can be reacted with such a high amount of salicylic acid yielding a workable solution.

In addition, the accelerator of the present invention is found to be storage stable such as for example, after about 1 month of storage at room temperature (about 25° C.), the accelerator product is non-crystallizing; does not change viscosity, and does not change color.

The accelerator of the present invention can be used in combination with amine hardeners and thermosetting resins such as epoxy resins to form a curable epoxy resin composition that can be cured at cold or ambient temperatures such as for example, at temperatures of from about −5° C. to about 30° C. in one embodiment.

DETAILED DESCRIPTION

In its broadest scope, the present invention includes a salicylic acid-containing liquid accelerator building block composition for aminic hardeners comprising the reaction product of (a) salicylic acid; and (b) at least one amine compound; wherein the composition is in liquid form in the absence of a solvent. The salicylic acid-containing liquid accelerator building block composition can then be used as an additive in a curable composition comprising (i) a thermosetting resin such as an epoxy resin, (ii) the salicylic acid-containing liquid accelerator building block composition and (iii) at least one amine compound. Optionally, the curable composition may contain at least one other modifier agent.

The salicylic acid salt, component (a), useful in the present invention for forming the salicylic acid-containing liquid accelerator building block composition for aminic hardeners may include for example 2-methylpentanediamine (MPMD); polyetherdiamines such as Jeffamine D-230 and Jeffamine D-400 commercially available from Huntsman or BASF; trimethylpentamethylene diamine (TMD); or mixtures thereof.

Generally, the amount of salicylic acid salt used in the present invention may be in the range from about 1 wt % to about 55 wt % in one embodiment, from about 1 wt % to about 35 wt % in another embodiment; from about 1 wt % to about 30 wt % in still another embodiment; and from about 1 wt % to about 25 wt % in yet another embodiment. When the salicylic acid is used below 1 wt %, no acceleration takes place and when the salicylic acid is used above 55 wt %, the viscosity of the resulting composition is too high; and ultimately, the hardener will lead to water sensitive cured products.

The hardener component (also referred to as a curing agent or cross-linking agent), component (b), useful in the present invention may be any compound having an amine active group capable of being reactive with a reactive epoxy group. For example, the hardener useful in the present invention includes nitrogen-containing compounds such as amines and their derivatives; and combinations of two or more of amine hardeners. The amine hardener may be selected from any known amine hardeners in the art. Generally, the amine hardener used in the present invention is selected from amines which exhibit a high reactivity (for example, resins with a pot life of below about 15 minutes and which exhibit a low viscosity (for example, viscosities of below about 1000 mPa-s. For example, the amine hardener compound (b) useful in the present invention may include amines such as xylylene diamine (MXDA); isophoronediamine (IPDA); 1,3 diaminomethyl cyclohexane (1,3 BAC); pre-polymers (adducts) of such amines with liquid epoxy resins (LER) or other epoxies; and mixtures thereof.

Practically, polyamines, dicyandiamide, diaminodiphenylsulfone and their isomers, aminobenzoates, various acid anhydrides, phenol-novolac resins and cresol-novolac resins, for example, may be used in the present invention, but the present invention is not restricted to the use of these compounds.

The hardeners of choice may depend on the application requirements. Generally, the hardener useful in the present invention may be selected from, for example, but are not limited to, dicyandiamide, substituted guanidines, phenolic, amino, benzoxazine, anhydrides, amido amines, polyamides, polyamines, aromatic amines, carbodiimides, polyesters, polyisocyanates, polymercaptans, urea formaldehyde and melamine formaldehyde resins, and mixtures thereof.

In one embodiment, the at least one hardener may include one or more of aliphatic amines such as ethanolamine, ethylenediamine, diethylenetriamine (DETA), triethyleneaminetetramine (TETA), 1-(o-tolyl)-biguanide, dicyandiamide, amine-terminated polyols, aromatic amines such as methylenedianiline (MDA), toluenediamine (TDA), diethyltoluenediamine (DETDA), diaminodiphenylsulfone (DADS), polyphenols such as bisphenol A, bisphenol F, 1,1-bis(4-hydroxyphenyl)-ethane, hydroquinone, resorcinol, catechol, tetrabromobisphenol A, novolacs such as phenol novolac, bisphenol A novolac, hydroquinone novolac, resorcinol novolac, naphthol novolac, mercaptans such as mercaptan-terminated polysulfide polymers, Capcure (trademark of Cognis) hardeners, anhydrides such as phthalic anhydride, trimellitic anhydride, nadic methyl anhydride, methyl tetrahydrophthalic anhydride, methyl hexahydrophthalic anhydride; or mixtures thereof.

Generally, the amount of hardener used in the present invention may be in the range from about 50 wt % to about 90 wt % in one embodiment, from about 60 wt % to about 93 wt % in another embodiment; from about 65 wt % to about 95 wt % in still another embodiment; and from about 75 wt % to about 97 wt % in yet another embodiment.

In addition to the salicylic acid/amine salt (a) and the other aminic components (b), various other optional compounds can be included in the salicylic acid accelerator building block composition including for example certain modifiers. The modifiers may include for example styrenated phenol; diisopropylnaphthalene; benzyl alcohol; C12/C14 or C13/C15 fatty alcohol; or mixtures thereof.

Generally, the amount of optional compounds used in the present invention may be in the range from about 1 wt % to about 50 wt % in one embodiment, from about 1 wt % to about 40 wt % in another embodiment; from about 1 wt % to about 30 wt % in still another embodiment; and from about 1 wt % to about 20 wt % in yet another embodiment.

In general, the process of preparing the salicylic acid-containing liquid accelerator building block composition for aminic hardeners may be carried out by the following steps: charging an amine, such as MPMD, Jeffamine D-230 or TMD into a reaction vessel and then heating the amine slightly for example from about 5° C. to about 50° C. in one embodiment; from about 10° C. to about 40° C. in another embodiment; and from about 20° C. to about 30° C. in still another embodiment. After heating the amine, a salicylic acid is added to the heated amine in small portions in a manner that the salicylic acid essentially does not form aggregates under vigorous stirring and cooling to maintain the mixture at a temperature of below about 150° C. in one embodiment; from about 80° C. to about 140° C. in another embodiment; and from about 90° C. to about 110° C. in still another embodiment.

The salicylic acid may added intermittently or continuously in small portions such as from about 5 wt % to about 50 wt % in one embodiment; from about 10 wt % to about 40 wt % in another embodiment; and from about 20 wt % to about 30 wt % in still another embodiment.

Generally, the salicylic acid-containing liquid accelerator building block composition for aminic hardeners of the present invention advantageously has a low viscosity. By "low viscosity" with reference to the salicylic acid-containing liquid accelerator building block composition for aminic hardeners of the present invention, it is meant that the composition has a viscosity of generally in the range of from about 4 mPa-s to about 40000 mPa-s in one embodiment; from about 30 mPa-s to about 30,000 mPa-s in another embodiment; from about 40 mPa-s to about 25,000 mPa-s in still another embodiment; and from about 350 mPa-s to about 18,000 mPa-s in yet another embodiment; wherein the viscosity is measured under the processing conditions of the composition such as for example at a temperature of about 25° C. as measured by ISO 3219-B.

Generally, the salicylic acid-containing liquid accelerator building block composition for aminic hardeners of the present invention advantageously has an amine number of from about 40 mg KOH/g to about 960 mg KOH/g in one embodiment; from about 240 mg KOH/g to about 900 mg KOH/g in another embodiment; from about 300 mg KOH/g to about 800 mg KOH/g in still another embodiment; and from about 400 mg KOH/g to about 750 mg KOH/g in yet another embodiment as measured by ISO 9702.

Generally, the salicylic acid-containing liquid accelerator building block composition for aminic hardeners of the present invention advantageously has an color index of from about 0 Gardner to about 10 Gardner in one embodiment; from about 0 Gardner to about 8 Gardner in another embodiment; from about 0 Gardner to about 6 Gardner in still another embodiment; and from about 0 Gardner to about 4 Gardner in yet another embodiment as measured by ASTM D1544.

Generally, the salicylic acid-containing liquid accelerator building block composition for aminic hardeners of the present invention advantageously has a refractive Index number of from about 1.5100 to about 1.5500 in one embodiment; from about 1.5120 to about 1.5480 in another embodiment; from about 1.5140 to about 1.5460 in still another embodiment; and from about 1.5160 to about 1.5420 in yet another embodiment as measured by ASTM D1804.

Generally, the salicylic acid-containing liquid accelerator building block composition for aminic hardeners of the present invention is advantageously storage stable or has storage stability for a period of time of from about 10 days to about 1 month in one embodiment; from about 20 days to about 2 months in another embodiment; from about 30 days to about 3 months in still another embodiment; and from about 40 days to about 4 months in yet another embodiment as measured by visual inspection. "Storage stable" with reference to a composition, formulation or solution herein means a composition, formulation or solution that undergoes no discoloration, no crystallization after a period of at least 1 month under storage conditions. A storage stable composition, formulation or solution means a non-crystallizing material as measured by visual inspection.

In a preferred embodiment, the salicylic acid-containing liquid accelerator building block composition for aminic hardeners of the present invention advantageously has no solvent or may have trace amounts or contamination amounts of solvent, but no solvent is added to the composition intentionally; and therefore, the composition has an absence of solvent in the composition. "Absence of solvent" with reference to a composition, formulation or solution herein means generally less than 3 wt % of a solvent present in the composition in one embodiment; from 0 wt % to about 1 wt % solvent present in the composition in another embodiment; and from 0 wt % to about 0.1 wt % solvent present in the composition in still another embodiment; and wherein the solvent is a material with a boiling point of below about 250° C.

In a preferred embodiment, the salicylic acid-containing liquid accelerator building block composition for aminic hardeners of the present invention is advantageously processable, manageable, and workable. "Processable", "manageable" and "workable" with reference to a composition, formulation or solution herein means a composition that can be readily and easily mixed with other ingredients without forming an insoluble material and wherein the composition is in liquid form with a viscosity of less than about 20,000 mPa-s at 30° C. to 50° C.

The curable or thermosetting epoxy resin formulation of the present invention may include one epoxy resin compound or may include a combination of two or more epoxy resins compounds as the first component (i). The epoxy resins useful in the present invention are those compounds containing at least one vicinal epoxy group and may include a wide variety of epoxy compounds. For example, the epoxy resin may be saturated or unsaturated, aliphatic, cycloaliphatic, aromatic or heterocyclic and may be substituted. The epoxy resin may also be monomeric or polymeric.

The epoxy resin compound, component (i) useful in the present invention may be selected from any known epoxy resins in the art. For example, an extensive enumeration of epoxy resins useful in the curable composition of the present invention includes epoxides described by Pham, H. Q. and Marks, M. J. *Epoxy Resins* in the Kirk-Othmer Encyclopedia of Chemical Technology; John Wiley & Sons, Inc.: online Dec. 4, 2004 and in the references therein; in Lee, H. and Neville, K., *Handbook of Epoxy Resins*, McGraw-Hill Book Company, New York, 1967, Chapter 2, pages 257-307 and in the references therein; May, C. A. Ed. *Epoxy Resins: Chemistry and Technology*, Marcel Dekker Inc.: New York, 1988 and in the references therein; and in U.S. Pat. No. 3,117,099; all which are incorporated herein by reference.

The epoxy resins, used in embodiments disclosed herein for component (i) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker useful in the present invention are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

In another embodiment, the epoxy resin useful in the present invention for the preparation of the epoxy resin composition may be selected from commercially available products. For example, D.E.R.® 330, D.E.R. 331, D.E.R. 332, D.E.R.324, D.E.R. 352, D.E.R. 354, D.E.R. 542, D.E.R. 560, D.E.N.® 431, D.E.N. 438, D.E.R. 736, or D.E.R. 732 available from The Dow Chemical Company may be used. As an illustration of the present invention, the epoxy resin component (a) may be a liquid epoxy resin, D.E.R. 383 (diglycidyl ether of bisphenol A) having an epoxide equivalent weight (EEW) of 175-185, a viscosity of 9500 mPa-s, and a density of 1.16 g/cc.

Other suitable epoxy resins useful as component (i) in the present invention composition are disclosed in, for example, U.S. Pat. Nos. 3,018,262;7,163,973; 6,887,574; 6,632,893; 6,242,083; 7,037,958; 6,572,971; 6,153,719; and 5,405,688; PCT Publication WO 2006/052727; U.S. Patent Application Publication Nos. 20060293172; 20050171237; 2007/0221890 A1; each of which is hereby incorporated herein by reference.

In one embodiment, the epoxy resin component (i) includes at least one epoxy resin and optionally at least one reactive diluent. A wide range of epoxy resins can be used in component (i). Some examples of suitable substitutes for D.E.R. 331 are other diglycidyl ethers of bisphenol A and bisphenol F such as are sold by Dow Chemical under the designations D.E.R. 330, D.E.R. 332, D.E.R. 383 and D.E.R. 354. A wide range of reactive diluents can be used including mono- and diglycidyl ethers of aliphatic alcohols and polyether glycols such as C2-24 alkylene glycols and poly(ethylene oxide) or poly(propylene oxide)glycols. Commercially available diglycidyl ethers of alcohols that are useful include 1,6-Hexanediol diglycidylether and 1,4-Butanediol diglycidylether.

In one preferred embodiment, the epoxy resin component (i) of the present invention may include for example a LER (e.g., bisphenol A, bisphenol F and the like) diluted with mono- or difunctional reactive diluent such as for example butanedioldiglycidylether (BDDGE), hexanediol diglycidylether (HDDGE), or C12/C14 fatty alcohol monoglycidylether.

In general, at least one of the epoxy resins used the composition of the present invention, has a viscosity of between about 1 mPa-s and about 100,000 mPa-s in one embodiment, between about 5 mPa-s and about 50,000 mPa-s in another embodiment, between about 10 mPa-s and about 10,000 mPa-s in still another embodiment, and between about 10 mPa-s and about 1,000 mPa-s in yet another embodiment, at ambient temperature (about 20° C. to 25° C.).

The concentration of the epoxy resin used in the present invention may range generally from about 40 wt % to about 90 wt % in one embodiment, from about 50 wt % to about 80 wt % in another embodiment, and from about 60 wt % to about 70 wt % in still another embodiment, based on the total weight of the composition.

In another embodiment, the composition may have the following stoichiometric ratios of total epoxy resin to total hardener such as for example generally in the range of from about 0.90 to about 1.10 (epoxy:hardener) in one embodiment, from 0.95 to about 1.05 in another embodiment, and from about 0.98 to about 1.02 in still another embodiment.

The accelerator, component (ii), used in the epoxy resin formulation of the present invention includes the salicylic acid-containing liquid accelerator building block composition for aminic hardeners described above.

The concentration of the accelerator used in the present invention may range generally from about 0.1 wt to about 20.0 wt % in one embodiment, from about 0.5 wt % to about 15.0 wt % in another embodiment, and from about 1 wt % to about 10.0 wt % in still another embodiment, based on the total weight of the composition.

The amine hardener, component (iii), used in the epoxy resin formulation of the present invention may include one or more known amine compounds or amine adducts. For example, the amine hardener may include any of the amine hardeners described above with reference to the preparation of the salicylic acid-containing liquid accelerator building block composition for aminic hardeners described above.

The concentration of the amine hardener, component (iii), used in the present invention may range generally from about 5.0 wt to about 49.9 wt % in one embodiment, from about 12.0 wt % to about 35.0 wt % in another embodiment, and from about 15.0 wt % to about 25.0 wt % in still another embodiment, based on the total weight of the composition.

In general, the curable or thermosetting epoxy resin formulation of the present invention may include one or more optional compounds known in the art. For example, the formulation may include non-VOC modifiers such as those modifiers having a boiling point of above 250° C. For example, the modifier may include diisopropylnaphthalene, styrenated phenol, nonylphenol or mixtures thereof.

Other optional components, that may be useful in the epoxy resin formulation of the present invention, are components normally used in resin formulations known to those skilled in the art. For example, the optional components may comprise compounds that can be added to the composition to enhance the reaction rate, the selectivity of the reaction, and/or the catalyst lifetime.

An assortment of optional additives may be added to the reactive curable epoxy resin composition of the present invention including for example, fillers, curing catalyst, other resins, stabilizers, plasticizers, catalyst de-activators, dyes, pigments, thixotropic agents, photo initiators, latent catalysts, inhibitors, solvents, surfactants, fluidity control agents, diluents that aid processing, adhesion promoters, flexibilizers, toughening agents, fire retardants, and the like; and mixtures thereof.

The concentration of the optional additives used in the present invention may range generally from 0 wt % to about 40 wt % in one embodiment, from about 0.1 wt % to about 40 wt % in another embodiment, from about 0.1 wt % to about 30 wt % in still another embodiment, from about 0.1 wt % to about 20 wt % in yet another embodiment, and 0.1 wt % to about 10 wt % in even yet another embodiment, base on the weight of all the components in the composition.

Once the salicylic acid-containing liquid accelerator building block composition for aminic hardeners of the present invention is formed as described above, the salicylic acid-containing liquid accelerator building block composition may be used soon after its preparation by admixing with other compounds by standard techniques known in the art; or the salicylic acid-containing liquid accelerator building block composition may be used much later after the composition is prepared because the composition is storage stable as aforementioned. There is no criticality in the blending of the compounds of the present invention.

Generally, the process for preparing the epoxy resin formulation includes admixing (a) at least one epoxy resin; (b) the hardener of the present invention; and optionally various additives such as (c) non-VOC modifier. For example, the preparation of the curable epoxy resin formulation of the present invention is achieved by admixing in a vessel the epoxy resin, the salicylic acid-containing liquid accelerator building block composition, the hardener agent, and optionally any other desirable additive; and then allowing the components to formulate into an epoxy resin composition. Any of the above-mentioned optional assorted formulation additives may be added to the composition during the mixing or prior to the mixing to form the final curable composition.

All the components of the epoxy resin formulation are typically mixed and dispersed at a temperature enabling the preparation of an effective epoxy resin composition having a viscosity for the desired application. The temperature during the mixing of all components may be generally from about 20° C. to about 80° C. and preferably from about 15° C. to about 35° C. Lower mixing temperatures help to minimize reaction of the resin and hardener components to maximize the pot life of the formulation.

In preparing the curable formulation, there is no criticality in the blending of the reaction compounds to prepare the composition of the present invention as the preparation of the curable composition may be carried out by admixing the reactant compounds by standard techniques known in the art. Generally, the curing of the curable epoxy resin formulation may be carried out at a predetermined temperature and for a predetermined period of time sufficient to cure the composition. In one embodiment, a B-stageable thermosetting resin composition of the present invention may be first produced followed by complete curing of the composition (C-stage). The curing is carried out via thermal cure. For example, the temperature of curing the formulation may be generally from about 10° C. to about 200° C. in one embodiment; from about 25° C. to about 100° C. in another embodiment; and from about 30° C. to about 90° C. in still another embodiment.

The curing time may be chosen generally between about 1 minute to about 4 hours in one embodiment, between about 5 minutes to about 2 hours in another embodiment, and between about 10 minutes to about 1 hour in still another embodiment. Below a period of time of about 1 minute, the time may be too short to ensure sufficient reaction under conventional processing conditions; and above about 4 hours, the time may be too long to be practical or economical.

At the C-stage, generally more than about 70 mol % of the thermosetting moieties of the resin have reacted, in one embodiment; more than about 80 mol % of the thermosetting moieties of the resin have reacted, in another embodiment; and more than about 90 mol % of the thermosetting moieties of the resin have reacted, in still another embodiment.

The thermoset product (i.e. the cross-linked product made from the curable epoxy resin formulation) of the present invention shows several improved properties over conventional epoxy cured resins. For example, the cured product of the present invention (i.e., the C-staged material) may have a good surface appearance as measured by visual inspection. Generally, the cured product appears to have no carbamates; and may be slightly distorted and slightly tacky by visual and/or haptic inspection.

Generally, the cured product of the present invention advantageously has a Shore D Hardness as measured by ASTM D2240, of from about 60 to about 82 in one embodiment; from about 70 to about 81 in another embodiment; from about 72 to about 80 in still another embodiment; and from about 78 to about 80 in yet another embodiment.

The curable epoxy resin composition containing the salicylic acid-containing liquid accelerator building block composition for aminic hardeners of the present invention may be used to manufacture various articles, composites, adhesives, laminates, and the like, such as for example but not limited to, self-leveling flooring, tank lining (e.g., potable water tanks or wine fermenters), lacquers, paints, adhesives, chemical anchors, and the like.

EXAMPLES

The following examples and comparative examples further illustrate the present invention in detail but are not to be construed to limit the scope thereof.

In the Examples, various terms and designations are used including for example the following: "Sali" stands for salicylic acid; "MPMD" stands for 2-methylpentanediamine; "SP-F" stands for styrenated phenol; "MXDA" stands for m-xylylene diamine; "MXDA-LER adduct" is reaction product of MXDA with bisphenol-A diglycidyl ether; "TMD" stands for trimethylpentamethylene diamine; "1,3 BAC" stands for 1,3 diaminomethyl cyclohexane; "BenzOH" stands for benzyl alcohol; "HEW" stands for hydrogen equivalent weight; and "D-230" stands for the polyetheramine Jeffamine D-230, commercial available from Huntsman.

In the Examples, various standard analytical equipment and test methods are used including the following: viscosity is measured by ISO 3219-B; amine number is measured by ISO 9702; color is measure by ASTM D1544; refractive Index is measured by ASTM D1804; Shore D hardness is measured by ASTM D2240; pot life is measured by the gel time of a 100 g mixture according to DIN 16945; and surface appearance is measured by visual and/or haptic inspection.

Comparative Examples A-C—Synthesis of Building Block With Modifier

A modifier, such as benzyl alcohol or SP-F as shown in Table I, was heated to 60° C. and then salicylic acid was added, in small predetermined portions such as from ⅒ to ⅕ of the whole amount, to the heated modifier. An amine was added to the resulting heated mixture at a rate sufficiently slow such that under cooling the temperature was kept below 100° C. The addition of the amine was carried out under stifling so that essentially no lumps are formed in the resulting mixture; and the temperature of the resulting mixture was kept below 100° C. After the amine was completely added to the mixture, the mixture was stirred for another 5 minutes (min) and then cooled to 40° C. The resulting product was a liquid solution and the solution was inspected visually for clearness.

Examples 1-4 and Comparative Examples D-F—Synthesis of Building Block Without Modifier An amine, such as MPMD, D-230 or TMD as shown in Tables I and II, was heated to 60° C., and then salicylic acid was added to the heated amine in small portions (e.g., in thirds or in quarters of the total amount of the salicylic acid). The salicylic acid is added slowly to the heated amine in a manner such that the salicylic acid essentially does not form aggregates; and the addition made under stirring so that essentially no lumps are formed in the resulting mixture and cooling. The temperature of the resulting mixture was kept below 100° C. After the amine was completely added to the mixture, the mixture was stirred for another 5 min and then cooled to 40° C. The resulting product was a liquid solution and the solution was inspected visually for clearness.

TABLE I

Amines With and Without Modifiers

| | Example | | | | | |
|---|---|---|---|---|---|---|
| | Comparative Example A | Comparative Example B | Comparative Example C | Comparative Example D | Comparative Example E | Comparative Example F |
| Ingredients; (concentration, g): | (a) SP-F; 31.75 (b) Sali; 20.63 (c) 1,3 BAC; 47.62 | (a) SP-F; 32.48 (b) Sali; 21.1 (c) 1,3 BAC; 46.42 | (a) BenzOH; 31.25 (b) Sali; 37.50 (c) TMD; 31.25 | (a) TMD; 62.5 (b) Sali; 37.5 | (a) D-230; 62.5 (b) Sali; 37.5 | (a) 1,3 BAC; 62.5 (b) Sali; 37.5 |
| Viscosity @ 25° C. [mPas]: | 19,500 | 28,600 | 4,900 | 8,800 | 117,650 (25° C.) 12,500 (40° C.) | 37,000 |

TABLE I-continued

Amines With and Without Modifiers

| | Example | | | | | |
|---|---|---|---|---|---|---|
| | Comparative Example A | Comparative Example B | Comparative Example C | Comparative Example D | Comparative Example E | Comparative Example F |
| Amine Number [mgKOH/]): | 375 | 380 | 228 | 441 | 294 | 497 |
| Color [Gardener]: | 2.4 | 2.0 | 8.3 | 2.9 | 2.7 | 0.2 |
| Refractive Index: | 1.5602 | 1.5603 | 1.5484 | 1.5223 | 1.5222 | 1.5474 |

TABLE II

Amines Without Modifiers

| Example: | Example 1 | Example 2 | Example 3 | Example 4 |
|---|---|---|---|---|
| Ingredients; (concentration, g): | (a) MPMD; 62.5 (b) Sali; 37.5 | (a) MPMD; 37.5 (b) Sali; 62.5 | (a) MPMD; 50.0 (b) Sali; 50.0 | (a) MPMD; 55.0 (b) Sali; 45.0 |
| Viscosity @ 25° C. [mPas]: | 404 | Not measurable | 16,700 | 2,800 |
| Amine Number [mgKOH/]): | 605 | Not measurable | 485 | 531 |
| Color [Gardener]: | 3.1 | Not measurable | 3.7 | 1.9 |
| Refractive Index: | 1.5200 | Not measurable | 1.5370 | 1.5345 |

Example 5 and Comparative Example G—Synthesis of Hardener Formulations

The components described in Table III were mixed at room temperature (about 25° C.) to yield a hardener formulation. Several properties of the resulting hardener formulations were measured and the results are described in Table III.

TABLE III

Hardener Formulations

| Examples | Comparative Example G (Use of Precursor from Comparative Example D) | Example 5 (Use of Precursor from Example 4) |
|---|---|---|
| Components of Hardener; (concentration, g): | (a)MXDA-LER adduct; 34 (b)Precursor of Comparative Example D; 32 (c)TMD; 24 (d)MXDA; 10 | (a)MXDA-LER adduct; 34 (b)Precursor of Example 4; 26.67 (c)TMD; 24 (d)MXDA; 15.33 |
| Hardener Properties | | |
| HEW; [g/eq]: | 52 | 48 |
| Viscosity 25° C.; [mPa-s]: | 301 | 210 |
| Amine number; [mg KOH/g]: | 558 | 607 |
| Color; [Gardner]: | 0.4 | 0.8 |
| Refractive index: | 1.5348 | 1.5376 |
| Epoxy Resin Composition Properties | | |
| Pot life at 23° C. of a100 g batch of (a) an epoxy resin; and (b) a hardener [min]: | 16 | 16 |
| Cured Product Properties | | |
| Surface appearance: | no carbamate, smooth, very little tackiness | no carbamate, slightly distorted, tacky |
| | 23° C. / 13° C. | 23° C. / 13° C. |
| Shore D Hardness: | 4 h: 66D<br>6 h: 75D / 15D<br>8 h: 80D / 60D<br>24 h 80D / 74D | 4 h: 66D<br>6 h: 75D / 15D<br>8 h: 78D / 55D<br>24 h 80D / 74D |

Table I above shows that amines in combination with a high content of salicylic acid salt (Comparative Examples A-F) need to be diluted with a solvent, such as benzyl alcohol or SP-F, to be workable at a useful viscosity range.

Table II above shows that with a combination of salicylic acid and MPMD in the compositions of the present invention (Examples 1-4), no diluents are necessary to achieve a high load of salicylic acid.

Table III above shows that the formulations of Comparative Example G and Example 5, can both achieve good performance; however, the use of the hardener of Example 5 is easier because the formulation of Example 5 has a lower viscosity than the formulation of Comparative Example G; and because the load of salicylic acid in the formulation of Example 5 is higher than the load of salicylic acid in the formulation of Comparative Example G. In addition, less amount of accelerator building block can be used in a formulation. This can be advantageous because only the necessary amount of MPMD should be introduced into the hardener.

The surface appearance of both cured products made from the formulations of Comparative Example G and Example 5 (Table III) showed no carbamate, i.e., upon spotting the surface of the cured product with a drop of water, no whitening or blushing occurred (as is known in the art, carbamates are the reaction products between $H_2O$, $CO_2$ (from air) and amines).

The invention claimed is:

1. A salicylic acid salt-containing liquid composition comprising a reaction product of (a) salicylic acid; and (b) at least one amine compound compatible with said salicylic acid, wherein the at least one amine compound comprises 2-methylpentanediamine, a polyetherdiamine, trimethylpentamethylene diamine, or mixtures thereof;
   wherein the resulting composition comprises a liquid;
   wherein the resulting composition has a concentration of salicylic acid at from about 1 weight percent to about 55 weight percent; and
   wherein the resulting composition has a viscosity in the range of from about 500 mPa-s to about 20,000 mPa-s at 25° C.

2. The composition of claim 1, wherein the at least one amine compound comprises 2-methylpentanediamine.

3. The composition of claim 1, wherein the concentration of the salicylic acid comprises a range of from about 5 weight percent to about 50 weight percent.

4. The composition of claim 1, wherein the concentration of the at least one amine compound comprises a range of from about 50 weight percent to about 95 weight percent.

5. A process for making an accelerator precursor for a hardener comprising admixing (a) salicylic acid; and (b) at least one amine compound, wherein the at least one amine compound comprises 2-methylpentanediamine, a polyetherdiamine, trimethylpentamethylene diamine, or mixtures thereof;
   wherein the resulting precursor comprises a liquid;
   wherein the resulting precursor has a high load of salicylic acid at a concentration of from about 1 weight percent to about 55 weight percent; and
   wherein the resulting precursor has a viscosity of from about 500 mPa-s to about 20,000 mPa-s at 25° C.

6. A curable epoxy resin composition comprising (a) at least one epoxy resin, (b) a salicylic acid salt-containing liquid composition of claim 1; and (c) an amine hardener.

7. The composition of claim 6, wherein the concentration of the epoxy resin comprises a range of from about 40 weight percent to about 90 weight percent.

8. The composition of claim 6, wherein the concentration of the salicylic acid salt-containing liquid composition of claim 1 comprises a range of from about 0.1 weight percent to about 20 weight percent.

9. The composition of claim 6, wherein the concentration of the amine hardener comprises a range of from about 5 weight percent to about 49.9 weight percent.

10. The composition of claim 6, including an additive selected from a filler, a cure catalyst, a reactive diluent, a flexibilizing agent, a processing aide, a toughening agent, and a mixture thereof.

11. The composition of claim 10, wherein the concentration of the additive ranges from about 0.1 weight percent to about 40 weight percent.

12. A process for making an epoxy resin curable composition comprising admixing (a) at least one epoxy resin, (b) a salicylic acid salt-containing liquid composition of claim 1; and (c) an amine hardener.

13. A cured product comprising a product made by curing the epoxy resin formulation composition of claim 6.

14. A process for preparing a cured composite material comprising the steps of:
   (a) providing a curable epoxy resin formulation composition of claim 6; and
   (b) curing the composition of step (a) to form a cured composite.

* * * * *